United States Patent [19]

Elhaus

[11] Patent Number: 4,507,950
[45] Date of Patent: Apr. 2, 1985

[54] CONVEYING MEANS FOR EXTRUSION PROFILES

[76] Inventor: Friedrich W. Elhaus, Dorfstr. 21, 7761 Moos, Fed. Rep. of Germany

[21] Appl. No.: 362,660

[22] Filed: Mar. 29, 1982

Related U.S. Application Data

[63] Continuation-in-part of Ser. No. 96,681, Nov. 23, 1979, abandoned.

[30] Foreign Application Priority Data

Aug. 16, 1979 [DE] Fed. Rep. of Germany ....... 2933260

[51] Int. Cl.³ .................... B21C 35/00; B65G 25/04
[52] U.S. Cl. .................................... 72/257; 72/426; 198/774
[58] Field of Search ............... 72/257, 250, 419, 252, 72/426; 198/774, 773, 775, 614

[56] References Cited

U.S. PATENT DOCUMENTS

| | | | |
|---|---|---|---|
| 3,157,268 | 11/1964 | Anderson | 72/257 |
| 3,187,883 | 6/1965 | Umbricht | 198/774 |
| 3,215,260 | 11/1965 | Umbricht | 198/774 |
| 3,565,241 | 2/1971 | Race | 198/774 |
| 3,585,833 | 6/1971 | Carraher | 72/257 |
| 3,739,619 | 6/1973 | Follrath | 72/257 |
| 4,050,278 | 9/1977 | Asano et al. | 72/257 |
| 4,203,514 | 5/1980 | Hirai | 198/774 |

FOREIGN PATENT DOCUMENTS

| | | | |
|---|---|---|---|
| 2026973 | 2/1980 | United Kingdom | 72/426 |
| 610748 | 6/1978 | U.S.S.R. | 198/774 |

*Primary Examiner*—Lowell A. Larson
*Attorney, Agent, or Firm*—Laubscher, Philpitt & Laubscher

[57] ABSTRACT

A conveying apparatus for extrusion profiles, is disclosed in particular, those formed of non-ferrous metal, such as aluminum or aluminum alloys, supplied from the runout conveyor of an extruder in a direction transversely of the longitudinal extension of the extrusion profiles to stations of further processing. The apparatus comprises transfer beams, oriented in conveying direction, which are designed for effecting lifting and lowering as well as transfer motions in and opposite to the conveying direction and preferably adapted to be driven by a common drive. The motions in question are controllable as to path length and/or sequence in time and duration, preferably in synchronism and at infinitely variable length in lifting and/or transfer direction.

11 Claims, 19 Drawing Figures

CONVEYING MEANS FOR EXTRUSION PROFILES

This application is a continuation-in-part of Ser. No. 096,681, filed Nov. 23, 1979, now abandoned.

BRIEF DESCRIPTION OF THE PRIOR ART

The present invention relates to a conveying means for extrusion profiles, in particular of non-ferrous metal, from the runout conveyor of an extruder in a direction transversely of the longitudinal extension of the extrusion profiles to stations of further processing.

Immediately after pressing and severing from the press die extrusion profiles of non-ferrous metals, in particular aluminum alloys, must be lifted laterally from the runout conveyor and placed on the cooling table. On the cooling table they are then to be transported stepwise at the press cycle toward the drawing bench where they are oriented by drawing.

The lifting from the runout conveyor and transferring to the cooling table as well as the further transport must be effected while the extrusion profiles are still hot, a condition at which their surface is particularly sensitive to damage.

After the drawing, the extrusion profiles must be aligned and arranged in dense piles, i.e. closely together in order to be cut at right angles upon transfer to the saw roller bed.

Normally, in the area between the runout conveyor and the drawing bench, separately driven lifters are provided which lift the extrusion profiles at a certain angle from the runout conveyor, transfer them laterally and place them on the cooling table. There the extrusion profiles are then conveyed further by lifting beams in steps of 30 to 50 mm in correspondence with the operating cycle of the press. In placing the profiles manually in the drawing bench they are partly dragged over the beams of the cooling table.

With this manner of operation necessitated by the structure of the known means the surface of the hot profiles becomes damaged. Furthermore, it is not possible to run such a plant without operators at the drawing bench.

In the area between the drawing bench and the saw roller bed usually single or multipart conveyor belts or lifting beams or a combination of lifting beams and transmission arms are used. If conveyor belts are provided, there is no possibility of positioning, transporting and transferring the drawn extrusion profiles to the saw roller bed in sufficiently straight alignment so that disturbances are the result during the further processing. Furthermore, the extrusion profiles cannot be packed in sufficiently dense piles by the known apparatus, a fact which likewise does not contribute to facilitating the subsequent work.

The provision of lifting beams has the disadvantage that the transport can be effected only in constant steps, a fact which limits the transfer speed to 1 to 2 m/min in accordance with the respective size of the extrusion profiles. Furthermore, this tends to cause damages and makes it impossible to produce dense piles of extrusion profiles of random width because of the constant graduation of the conveying steps.

SUMMARY OF THE INVENTION

It is the object of the present invention to provide a means of the kind specified initially which does not have the disadvantages mentioned and permits simple, automatic transportation without any damage of the extrusion profiles from the runout conveyor of an extruder to stations of further processing.

To meet this object it is provided in a means of the kind specified initially that transfer beams oriented in conveying direction are provided which are designed for effecting lifting and lowering as well as transfer motions in and opposite to the conveying direction and which are adapted to be driven, said motions being controllable as to path length and/or sequence in time and duration, if desired, according to a predetermined operating program for the individual motions.

The transfer beams according to the invention thus effect a combined lifting and transferring motion by means of which they carry out all the functions of transportation, namely lifting the extrusion profiles from the runout conveyor, transferring them transversely of the runout conveyor, placing them down at the processing station and, if desired, lifting them from the processing station and transferring them for further transportation to one or more further processing stations, and effecting all this automatically and without any damage.

Preferably, the beams or arms which are disposed on the same are adapted to be driven in synchronism by means of common shafts in steps of movement of infinitely variable path length in lifting and/or transfer direction.

In an advantageous embodiment of the invention the transfer beams comprise a lift member and a transfer member, guided for displacement on the lift member, and separate drives, in particular pressure fluid cylinders for the lift member and the transfer member.

The invention can be used with particularly great advantage in a means comprising a cooling table, a drawing bench, a piling table, and a saw roller bed disposed side by side and parallel to the runout conveyor, the cooling table and piling table each being constituted by fixed beams oriented in conveying direction. In this context it is convenient to have a first group of transfer beams disposed between the fixed beams of the cooling table and a second group of transfer beams disposed between the fixed beams of the piling table.

The transfer beams of the first and second groups each are sub-divided into a lift member and a transfer member guided for displacement on the same. Yet advantageously, arms of different design and function are associated with the transfer beams of the first group, while the transfer beams of the second group have no such arms. Preferably, the lift members of the transfer beams of the first group thus comprise lifters at the runout conveyor end which are movable in the direction toward the runout conveyor and follow the lifting movements of the lift member and adapted to be reciprocated into and out of the runout conveyor by means of a separate drive. All lifters may be designed to be driven in synchronism by a common shaft. Furthermore, the transfer members of the transfer beams of the first group may comprise extension arms at the drawing bench end which are extensible in the direction toward the drawing bench. These extension arms serve to transmit the extrusion profiles from the cooling table to the drawing bench. The need be extended only if the drawing bench is run without any operators.

The transfer path length of the transfer beams is selected in accordance with the fact whether only stepwise further transportation or transfer from the cooling table to the drawing bench as well is desired.

Preferably, the fixed beams of the cooling table are provided at the drawing bench side with extension arms which are extensible in the conveying direction and the free ends of which may be supported on the fixed beams of the piling table for reasons of stability. Extension arms which are extensible opposite to the conveying direction may be provided at the drawing bench end of the fixed beams of the piling table.

The extension arms at the cooling table and the extension arms at the piling table permit automatic continuous transportation of the extrusion profiles from the cooling table into the area of the drawing bench and from the drawing bench to the piling table.

Instead of having extension arms it is also possible to provide transmission arms designed like the lifters at the transfer members at the drawing bench end. In this event the transfer beams carry out only the stroke which is required for the stepwise transport of the extrusion profiles on the cooling bed. The transmission arms then effect the transfer to the drawing bench, independently of the transfer beams. The course of movement during this transmission is opposite to that of the lifters.

Also the extension arms of the second group of transfer beams and the transmission arms of the first group of transfer beams at the drawing bench end may be driven in synchronism by common shafts.

BRIEF DESCRIPTION OF THE DRAWINGS

The invention will be described further, by way of example, with reference to the accompanying drawings, in which:

FIGS. 6a,b are top views reversed relative to FIG. 1 showing the structural parts of the cooling table between the centerlines of the runout conveyor and the drawing bench more in detail, wherein a transfer beam arrangement is shown in lowered position in FIG. 6b and in a lifted position in FIG. 6a;

DETAILED DESCRIPTION

The means shown in general in FIGS. 1 and 2a to 2e is arranged beside a runout conveyor 1 of an extruder (not shown) for extrusion profiles of aluminum alloys and serves for transportation of the extrusion profiles from the runout conveyor 1 to a cooling table designated in general by reference numeral 2, and from the cooling table to a drawing bench 3, from the drawing bench to a piling table 4, and from the piling table to a saw roller bed 5.

Figure 1:
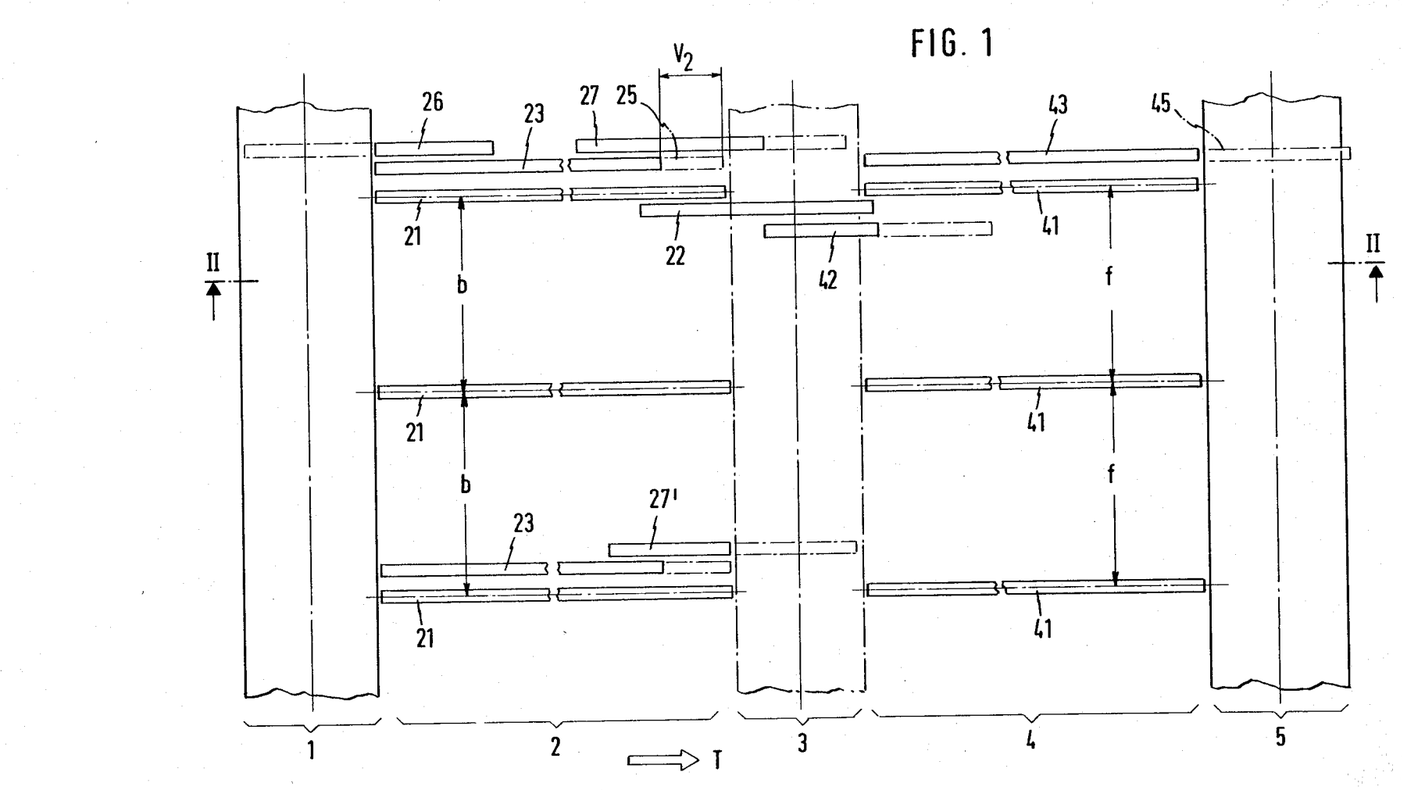
FIG. 1 is a top view of an arrangement comprising the runout conveyor of an extruder, a cooling table, a drawing bench, a piling table, and a saw roller bed with a means according to the invention.

All these devices 2 to 5 are disposed parallel to the runout conveyor 1.

The cooling table 2 comprises fixed beams 21 which are arranged at a spacing b between beams and comprise extension arms 22 at their ends facing the drawing bench, said extension arms being extensible in conveying direction T. When extended, the extension arms 22 bridge the area of the drawing bench 3 and are supported by their free ends on the piling table 4.

Figures 2B, 2C, 2D, 2E:
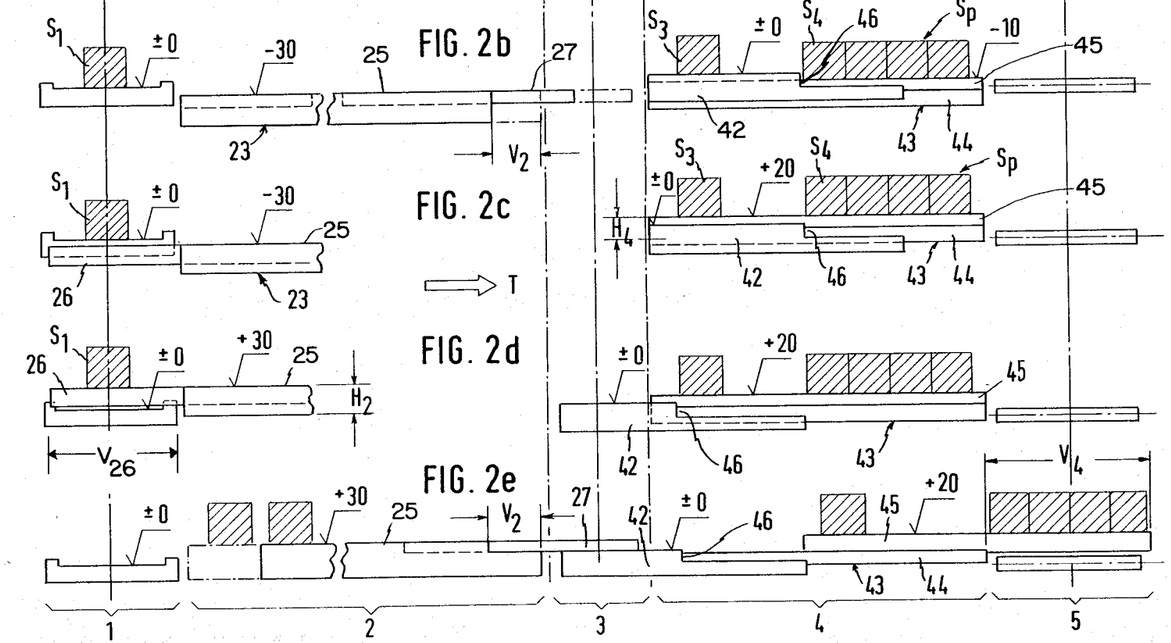
Figure 3:
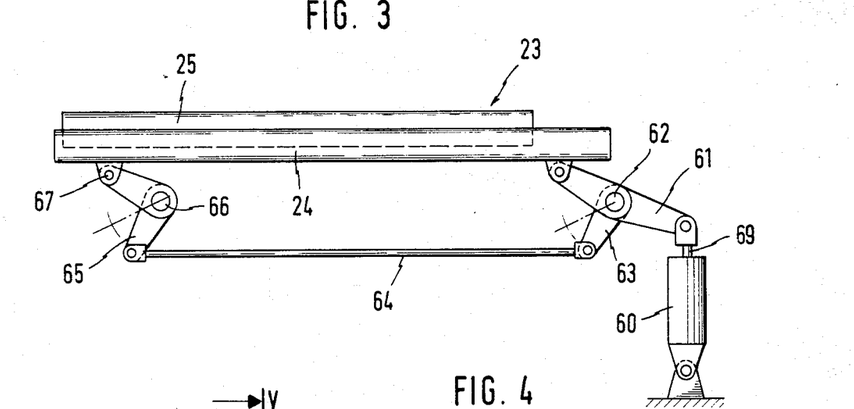
FIG. 3 is a diagrammatic presentation of a drive for the lift member of a transfer beam of the means according to FIGS. 1 and 2.
Figure 6A:
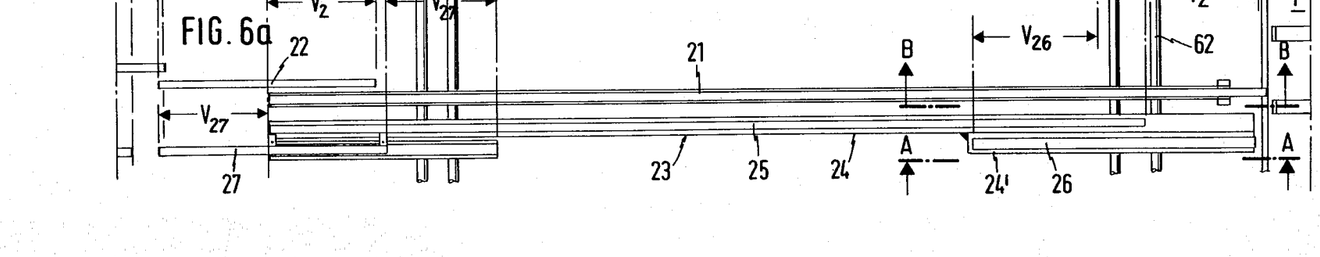
Figure 6B:
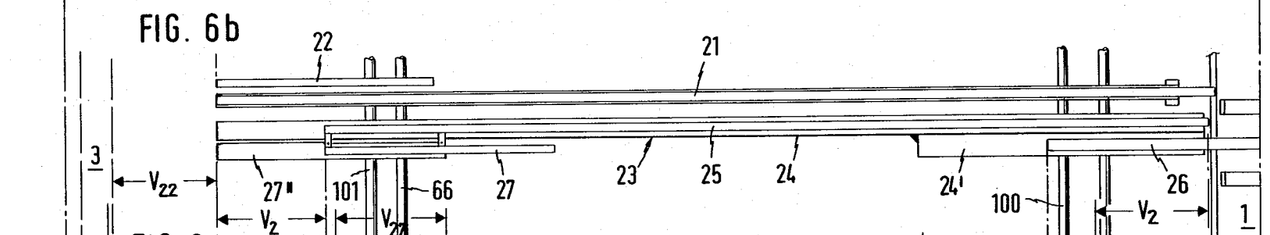

Adjacent the fixed beams 21 the cooling table 2 is provided with transfer beam means 23. These transfer beam means 23 comprise a lift member 24 (FIGS. 3,6,7) and a transfer member 25 guided for displacement in the same, each of these members being provided with its own drive to be explained in greater detail below. The transfer members 25 of the beams 23 of which only two are shown in FIG. 1 are adapted to move through a transfer path $V_2$. The beams effect a stroke $H_2$ (FIGS. 2d and 7) by means of which the transfer members are moved between a plane below the plane of the runout conveyor 1 and a plane above the plane of the runout conveyor 1. At their ends facing the runout conveyor the lift members 24 of the transfer beams carry lifters 26 with a common transfer drive by means of which the lifters 26 may be moved (in a constant horizontal stroke $V_{26}$ as seen in FIGS. 2d, 6a). into the area of the runout conveyor 1. As the lifters 26 are disposed at the left hand end (FIGS. 1 and 2) of lift mebers 24 of the transfer beams 23 they follow the vertical lifting movement according to stroke $H_2$ but not necessarily the horizontal transfer movement according to variable transfer path $V_2$ of the transfer members (FIGS. 2b,6b).

At their ends facing the drawing bench the transfer members 25 of the transfer beams carry extensible extension arms 27 which are extensible into the area of the drawing bench and serve to transmit the extrusion profiles S (FIGS. 2a to 2e) to the drawing bench 3. Transmission is effected only when the extension arms 27 are extended, by stroke $V_{27}$ (FIG. 6a) into the area of the drawing bench 3, and this is required only if the drawing bench is run without any operators. The transfer path $V_2$ of the transfer member 25 is infinitely variable in length, depending on whether stepwise further transport or transmission as well are desired. It is also possible to replace the extension arms 27 by transmission arms 27' of the same design as the lifters 26. Yet these are driven at the opposite course of movement. In this event the transfer member 25 cover only the path required for stepwise conveyance of the extrusion profiles on the cooling bed 2, (as will be described below) whereas the transmission is made exclusively by the transmission arms 27'.

The piling table 4 comprises a second group of fixed beams 41. These fixed beams 41 are likewise positioned at a spacing f between the individual beams which may correspond to the spacing b between the fixed beams 21 in the cooling table area. At their ends facing the drawing bench the fixed beams 41 carry extension arms 42 which are extensible opposite to the conveying direction T and shown in greater detail in side elevational view in FIGS. 2a to 2e. The extension arms 42 likewise may be driven in synchronism by a common shaft (not shown) from a common drive, and they have an engagement shoulder 46. The extension arms 42 are disposed at a slightly higher level than the level of the piling table 4, being disposed, for example, 10 mm higher.

Transfer beams 43 of which only one is shown in FIG. 1 are disposed parallel and adjacent to the fixed beams 41. The transfer beams 43 each include a lift member 44 and a transfer member 45. The transfer member 45 is movable in conveying direction T by a transfer path $V_4$ into the saw roller bed 5, the transfer beam 43 being adapted to be raised above the level of the piling table 4 by a stroke $H_4$ (FIG. 2c). Separate drives which all transfer beams have in common are provided for the lifting and transfer motions, as will be explained, by way of example of the drives of the transfer beams 23 in the area of the cooling table 2, with reference to FIGS. 3 to 5.

The lifting drive which all lift members 24 of the transfer beams 23 have in common comprises a pressure fluid cylinder 60 (FIG. 3) acting through a lever 61 on a continuous shaft 62. Toggle levers 63 are mounted on the shaft 62 at spacings corresponding to those between the transfer beams 23. At one arm these toggle levers are pivotally connected to a lift member 24, while an articulated connection through a rod 64 is provided between the respective other arm and another toggle lever 65. The toggle levers 65 are fixed for rotation on a shaft 66 disposed parallel to shaft 62 and are likewise pivotally connected to the lift members 24 at their other ends, at 67. Of course, the toggle levers may be replaced by one-arm levers disposed axially spaced on the shaft. The shafts 62, 66 are supported by bearings (not shown) in a casing.

Figures 4, 5:
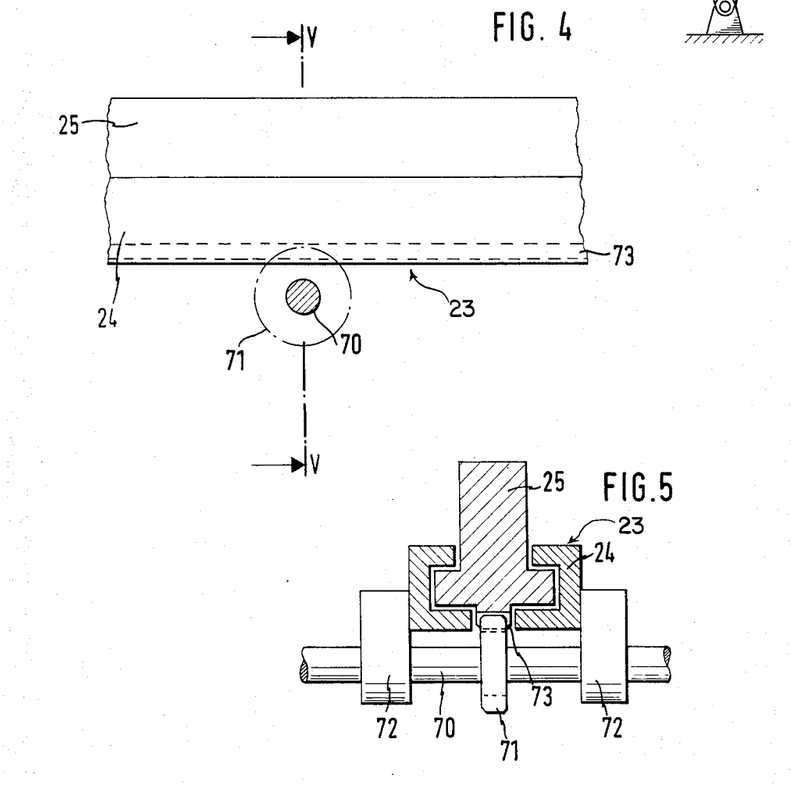
FIG. 4 is a diagrammatic presentation of a drive for the transfer member of a transfer beam according to FIGS. 1 and 2.
FIG. 5 is a sectional elevation along line V—V of FIG. 4, on an enlarged scale, showing further details.

The transfer members 25 follow the lifting motion of the lift members 24 and are displaceable in the same by a common transfer drive in accordance with FIGS. 4 and 5. The transfer drive means comprises a common continuous shaft 70 on which a pinion 71 each, in correspondence with each transfer member, is fixed for rotation. The bearings of the shaft are indicated at 72. At each transfer member 25 a rack 73 is fixed in such a manner that it meshes with the pinion 71. The transfer member 25 is moved in the C-shaped member 24, which acts as a guide, upon rotation of the shaft 70.

It is apparent that in order to displace a profile $S_1$ from runout conveyor 1 to drawing bench 3, the lifter means 26 transfers the profile onto the left hand end of transfer member 25, as shown in FIG. 2d, whereupon the transfer member 25 is displaced to the right to the extent of the horizontal stroke $V_2$, whereupon the transfer beam means 23 is lowered by the vertical stroke $H_2$. The transfer member 25 is shifted to the left by the horizontal stroke $V_2$, whereupon transfer beam means 23 is elevated by the vertical stroke $H_2$ to lift the profile from the fixed beams 21. The transfer member 25 is shifted to the right by the stroke $V_2$, and the step-by-step transfer of the profile is continued until it reaches the right hand end of the transfer beam 23, whereupon the extension arms 27 are operated to transfer the profile to the drawing bench station 3.

Obviously, the drive means described may also be of different conventional design. For instance, instead of the rack 73 and pinion 71 drive, a chain drive may be provided for generating the transfer motion of the transfer members 25.

Operation of the above means will now be described with reference to FIGS. 2a to 2e, FIGS. 6,7 and 9,10 respectively. In operating position according to FIG. 2a the extension arms 22 at the fixed beams 21 of cooling table 2 and the extension arms 42 at the piling table 4 are extended toward the drawing bench 3 so as to transmit an extrusion profile $S_3$ from the cooling table 2 to the drawing bench 3 and/or from the drawing bench 3 to the piling table 4. In this condition the transfer beams 23 and 43 are disposed in their bottom position.

In FIG. 2b the transfer beams 23 are as well shown in their lower basic position. In the area of the piling table the extension arms 42 are retracted, having moved an extrusion profile $S_3$ upon drawing from the drawing bench into the area of the piling table. As shown, by their engagement shoulder 46 the transfer beams 42 have moved an extrusion profile $S_4$ placed on the beams 41,43 of the piling table against a pile of extrusion profiles $S_p$. At this time, the transfer beams 43 are in their lower position.

During the operating step illustrated in FIG. 2c, 6b, 7b the lifters 26 are extended from the lift members 24 of the transfer beams 23 at low level thereof (approximately 30 mm below the level ±zero of the runout conveyor 1) below an extrusion profile $S_1$ on the runout conveyor.

In the area of the piling table, the transfer beams 43 are raised by a stroke $H_4$ so that all extrusion profiles on this table are lifted above the level of the piling table, i.e. of the fixed beams 41 (by approximately 30 mm, i.e. approximately 20 mm above the level ±zero since the fixed beams of the piling table are at a level of −10 mm). At this time, the extension arms 42 are retracted into their basic position at the fixed beams 41.

Figure 9A:
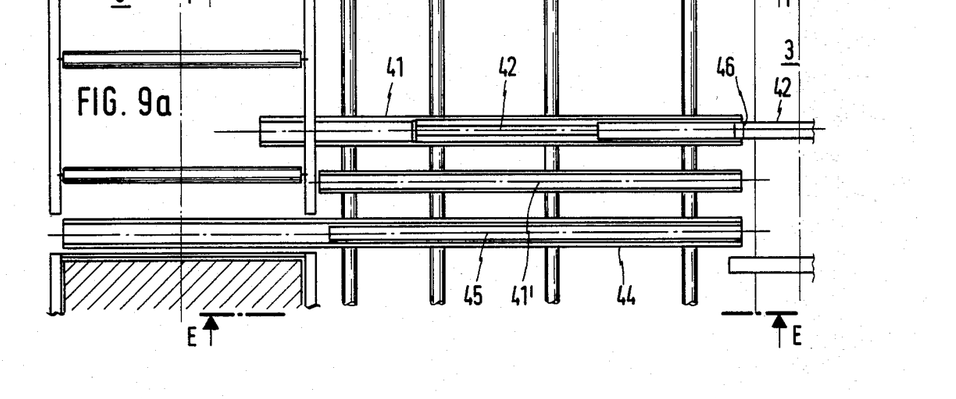
FIGS. 9a,b are top views reversed relative FIG. 1 showing the structural parts of the piling table between the center lines of the drawing bench and the saw roller bed, wherein a transfer beam arrangement is shown in lowered, retracted position in FIG. 9a and in a lifted, extended position in FIG. 9b.
Figure 10A:
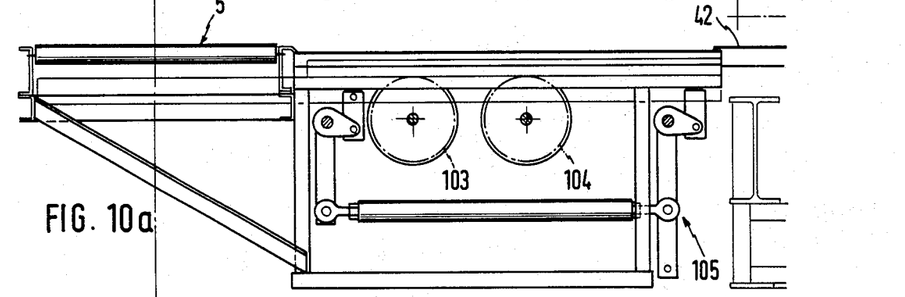
FIG. 10a is a sectional elevation along the line E—E in FIG. 9 showing the transfer beam arrangement in the lowered retracted position.

According to FIG. 2d the transfer members 25 now carry out a liftstroke $H_2$, with the lifter 26 extended, so as to lift the extrusion profile $S_1$ from the runout conveyor. At this time, the extension arms 22 may be extended. As the transfer beams 43 are lowered by the stroke $H_4$ and the extension arms 42 at the piling table are extended in the direction of the drawing bench (FIGS. 9a,10a).

During the next step according to FIG. 2e, 6a, 7a and 9b, 10b first of all, the lifters 26 of the transfer beams 23 are retracted, with the transfer beams 23 in raised position. In this manner the extrusion profile $S_1$ is moved from the runout conveyor into the area of the cooling table 2. In raised position the transfer members cover a preselected transfer path $V_2$ in conveying direction T. If desired, an extrusion profile S is transmitted to the drawing bench 3 by means of the extension arms 27.

Figure 9B:
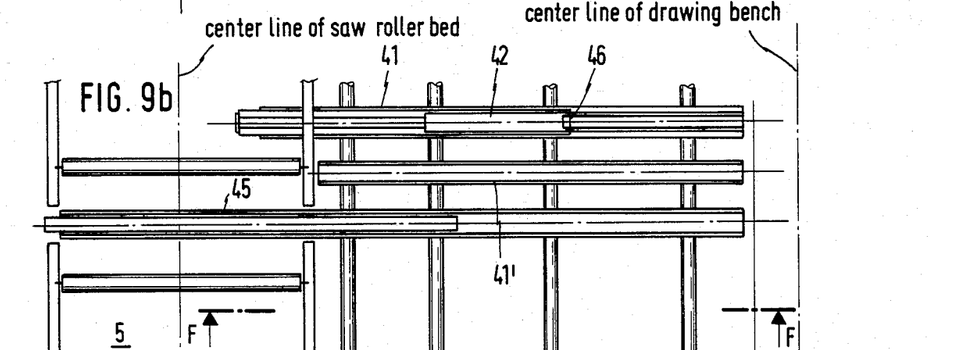
Figure 10B:
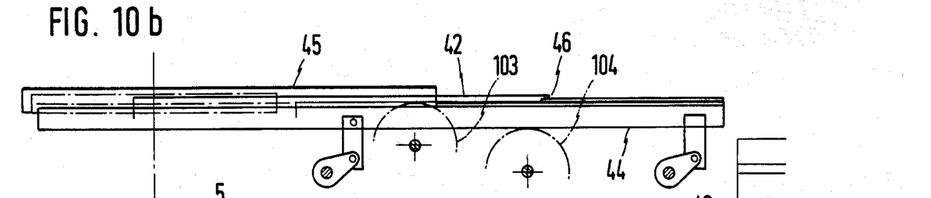
FIG. 10b is a sectional elevation along the line F—F in FIG. 9 showing the transfer beam arrangement in the lifted, extended position.

In the area of the piling table, with the transfer beam means 43 in raised position, the transfer members 45 are moved toward the saw roller bed to transmit the pile of extrusion profiles $S_p$ to the saw roller bed 5 (FIG. 9b,10b).

Figure 2A:
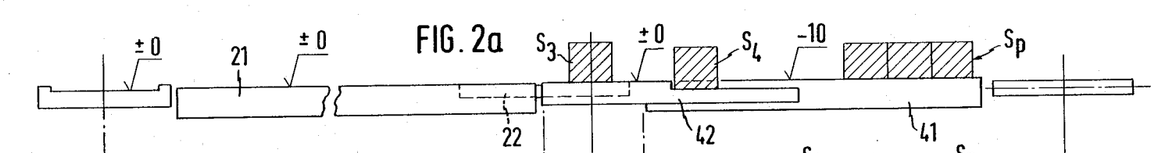
FIGS. 2a to 2e are sectional elevations along line II—II of FIG. 1, showing individual operating steps when applying the invention according to FIG. 1.

In the next step corresponding to FIG. 2a the transfer beam means 23 have again been lowered into their basic position and moved back. The transfer beam means 43 also have been lowered and moved back into the basic position as shown in FIG. 2a.

The path of the transfer movement $V_2$ of transfer member 25 is infinitely variable. All drive movements, including lifting movements may be program-controlled according to a predetermined course so that the extrusion profiles can be handled from the runout conveyor to the sawing in piles on the saw roller bed without any manual interference and without any damage.

Of course, common transfer drive means such as described with reference to FIGS. 4 and 5 may be provided to effect all transfer movements of the arms, beams or members 22,25,26,27,42,45 disposed at beams 21,23,41,43.

In FIGS. 7 to 10 the arrangement according to the invention is shown in more detail, and same parts are numbered by same reference numerals and not described in detail again.

Figure 7A:
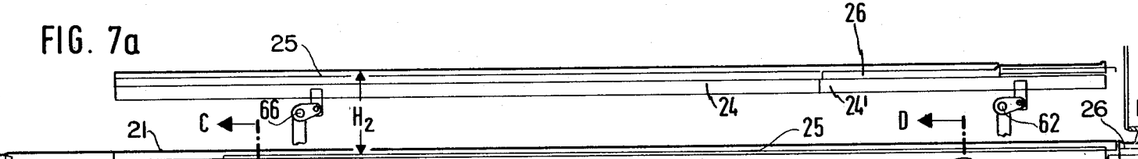
FIG. 7a is a sectional elevation along the line A—A in FIG. 6a showing the transfer beam arrangement in a lifted position additionally.

In FIGS. 6a, 6b, 7a reference numeral 24' designates guides which are fixed to corresponding lift members 24 for instance by welding. Each guide 24' serves as a guide means for a lifter 26 which therefore is guided for horizontal movement of a constant stroke $V_{26}$ towards the runout conveyor 1 and away from it. In a similar manner guides 27" are fixed on the sides of the lift members 24 at their drawing bench facing ends. In this guides 27" the extension arms 27 are guided to a horizontal movement of a distance $V_{27}$ in direction towards the drawing bench and away from it.

Figure 7B:
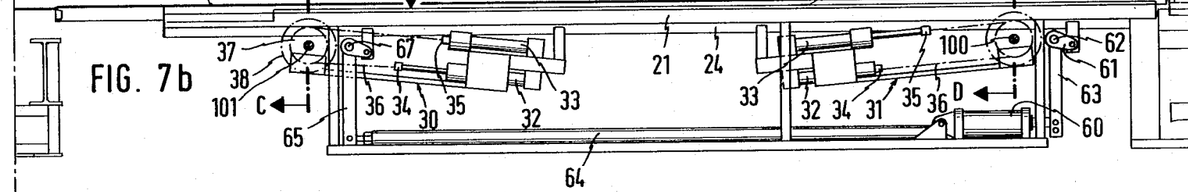
FIG. 7b is a sectional elevation along the line B—B in FIG. 6a showing the transfer beam arrangement in a lowered position and separate drive means for lifters and transfer beams.

In FIG. 7b horizontal drive means are schematically shown, i.e. a left drive means 30 for the transfer members 25 (which are guided to a horizontal movement of variable length $V_2$ along the lift members 24) and a right drive means 31 for the lifters 26 guided in the guides 24'.

Figure 8A:
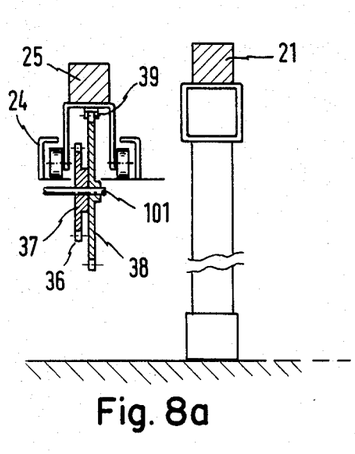
FIGS. 8a and 8b are sectional elevations, respectively through the drive means shown in FIG. 7b taken along lines C—C and D—D, respectively, in FIG. 7b at enlarged scale, such drive means being altered with respect to the drive means shown in FIG. 3 to 5.
Figure 8B:
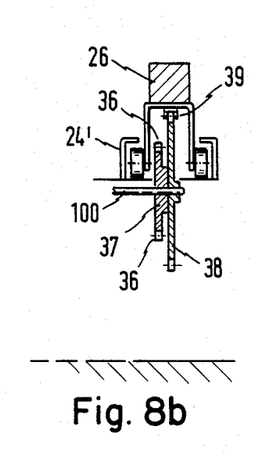

These drive means are described in the following at hand of FIG. 7b and FIG. 8 showing in the sectional view C—C the left drive means 30 and in the sectional view D—D the right drive means 31.

Each of these drive means has a pair of double-acting piston cylinder units 32, 33, at the piston rods at 34,35 of which the ends of a chain 36 are coupled. The chain is wound around a first sprocket wheel 37 which is fixed to a second sprocket wheel 38 of greater diameter, the sprocket wheel 38 cooperating with a rack or chain 39 fixed to the underside of the transfer member 25 or lifter 26 respectively and shown only in FIG. 8. The unit comprising the sprocket wheels 37,38 is rotatably fixed with a shaft 100 or 101 respectively carrying further sprocket wheels 38 (not shown) to cooperate with corresponding racks 39 in order to transmit the rotating movement of sprocket wheel 36 as well to transfer members 25 and lifters 26 which are arranged parallel to the transfer members and lifters shown in FIGS. 6 and 7.

Whereas the piston stroke of the cylinders 32,33 of the left drive means 30 is controlled to be variable in length the piston stroke of the piston-cylinder units 32, 33 of the righthand drive means is constant.

The elevating drive means to effect the lifting movement of the lift members 24 carrying the transfer members 25 corresponds basically to the drive means described above and shown in FIGS. 3 to 5. The lifting movement is caused by a cylinder 60 which acts on a linkage comprising levers 61 and 63 mounted on a common shaft 62 and acting through a connection rod 64 to a second linkage comprising levers 65,67 mounted on a common shaft 66. The common shafts 62,66 may be recognized in FIGS. 6 and 7. Thus it is clear that a lifting movement of the lift members 24 for a constant stroke $H_2$, a horizontal movement of the lifters 26 of constant stroke $V_{26}$ and a horizontal movement of the transfer members 25 of a varible stroke $V_2$ may be performed and controlled independently of each other in a timed relationship as described above.

The horizontal drive of the extension arms 42 guided at the fixed beams 41 in the area of the piling table (FIGS. 9,10) is performed by further drive means which are however constructed as described in connection with FIGS. 7b and 8 and therefore full description is not necessary. It is to be noted, however, that the drive means 30,31 of FIGS. 7b and 8 are lifted together with the lifting movement of lift member 24. In the same manner the horizontal drive means represented schematically by a sprocket wheel 103 in FIGS. 10a and 10b will be lifted together with the lifting movement of the lift member 44 whereas the horizontal drive means for the extension arms 42 represented by a sprocket wheel 104 are not to be lifted as the extension arms 42 under all conditions of operation remain on one and the same level.

The lift drive means for the lift members 44 and thereby the transfer members guided on said lift members 44 for a horizontal movement is of the same nature as the lift drive means described above in connection with FIGS. 3 and 7b and therefore only schematically depicted in FIGS. 10a and 10b and designated by reference numeral 105 in general.

What I claim is:

1. Conveying apparatus for conveying extrusion profiles (S) from the runout conveyor (1) of an extrusion press in a horizontal transfer direction (T) normal to the longitudinal extrusion axis of the press, comprising
   (a) a cooling table station (2) including a plurality of coplanar parallel horizontally spaced fixed beams (21) arranged normal to the runout conveyor; and
   (b) means for transferring an extrusion profile from said runout conveyor to said cooling station fixed beams, including
      (1) a plurality of parallel transfer beam means (23) arranged parallel with and between said fixed beams, each of said transfer beam means including
         (a) a horizontal lift member (24);
         (b) a transfer member (25) mounted for horizontal longitudinal displacement on said lift member;
         (c) elevating means (61–69) including a pressure fluid cylinder (60) for vertically displacing said lift member through a given vertical stroke ($H_2$) relative to said fixed beams; and
         (d) first drive means (38, 39; 71, 73) for longitudinally displacing said transfer member through a given horizontal stroke ($V_2$) relative to said lift member; and
      (2) lifter means for transferring an extrusion profile from the runout conveyor to said transfer member, said lifter means including
         (a) a lifter member (26) connected with said lift member for longitudinal displacement through a given horizontal stroke ($V_{26}$) between retracted and extended positions relative to said lift member, said lifter member being positioned, when extended, beneath said runout conveyor when said lift member is in its lowered position; and (b) second drive means (31) for displacing said lifter member between its extended and retracted positions relative to said transfer member.

2. Apparatus as defined in claim 1, wherein said first drive means (38, 39; 71, 73) is adjustable in steps to produce a displacement stroke ($V_2$) of infinitely variable path length.

3. Apparatus as defined in claim 2, wherein said first drive means includes rack and pinion means (71, 73).

4. Apparatus as defined in claim 1, wherein said elevating means further includes
parallelogram lever means (63, 65) connecting said cylinder (60) with said lift member.

5. Apparatus as defined in claim 1, and further including a drawing station (3) on the opposite side of said cooling station from said runout conveyor, and further including an extension arm (27) connected with the other end of said transfer member for longitudinal displacement between retracted and extended positions relative to said transfer member, said extension arm in the extended position extending within said drawing station.

6. Apparatus as defined in claim 5, and further including extension arms (22) mounted for movement on said fixed beams for displacement between retracted and extended positions relative to said fixed beams, said extension arms, when in the extended position, extending within said drawing station.

7. Apparatus as defined in claim 5, and further including a piling station (4) arranged on the opposite side of said drawing station from said cooling station, and a saw conveying station (5) arranged on the opposite side of said piling station from said drawing station, said piling station including a plurality of horizontally spaced fixed beams (41) parallel with the fixed beams (21), of said cooling station, and means including a second group of transfer beam means (43) for transferring an extrusion profile from the drawing station to the piling station fixed beams.

8. Apparatus as defined in claim 7, and further including further extension arms (42) connected with the ends of the piling table fixed beams (41) adjacent the drawing station for longitudinal displacement between retracted and extended positions relative to said fixed beams, said further extension arms, when in the extended condition, extending within said drawing station.

9. Apparatus as defined in claim 8, and further including a second group of transfer beam means (43) arranged parallel with and between said piling station fixed beams, said second transfer beam means including
(a) a second horizontal lift member (24);
(b) a second transfer member (45) mounted for horizontal displacement on the end of said second lift member adjacent the saw conveying station;
(c) elevating means for vertically displacing said lift member through a given vertical stroke ($H_4$) relative to said piling station fixed beams; and
(d) drive means for longitudinally displacing said second transfer member through a second horizontal stroke ($V_4$) relative to said second lift member;
(e) the transfer path of said second transfer member extending within the saw conveying station.

10. Apparatus as defined in claim 9, wherein the extension arm means (27) on the cooling station transfer member is driven in synchronism with the extension arms (42) in the fixed beams of the piling station.

11. Apparatus as defined in claim 9, wherein said second lift members (44) are liftable in synchronism to lift said second transfer members (45) to a level above the support surfaces of the extension arms (42) associated with the fixed beam means of the piling station.

* * * * *